April 22, 1941.　　　B. D. BEDFORD　　　2,239,437
ELECTRIC VALVE CONVERTING APPARATUS
Filed June 21, 1939　　　2 Sheets-Sheet 1
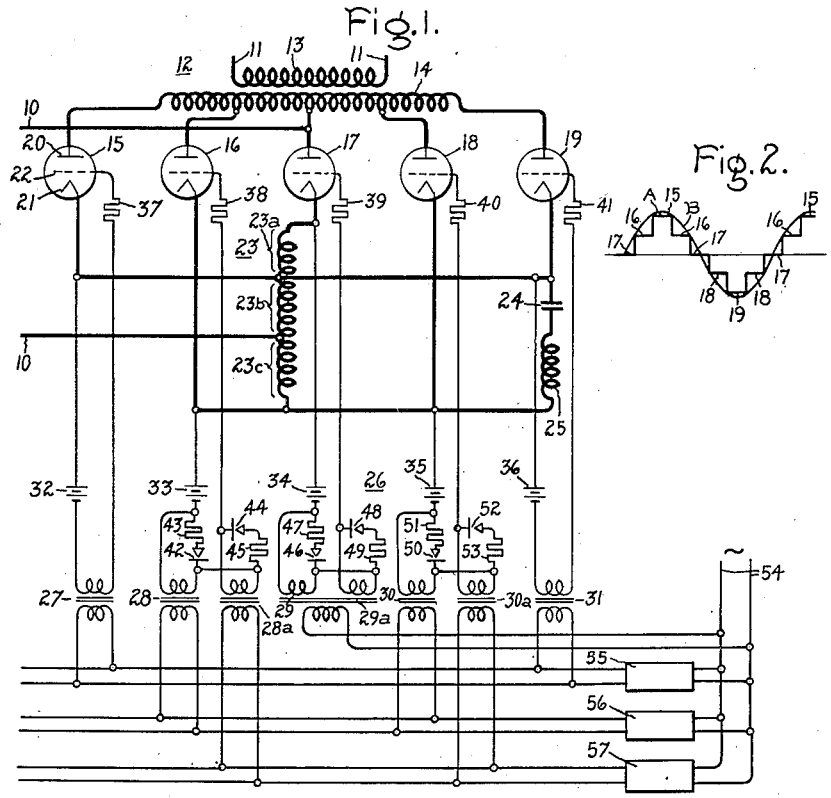
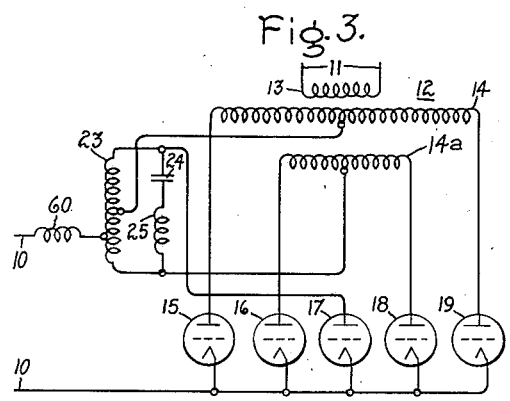
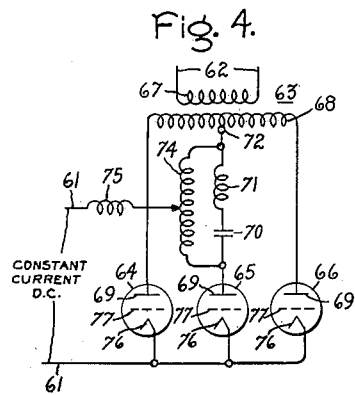
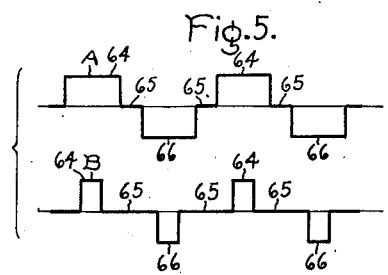
Inventor:
Burnice D. Bedford,
by Harry E. Dunham
His Attorney.

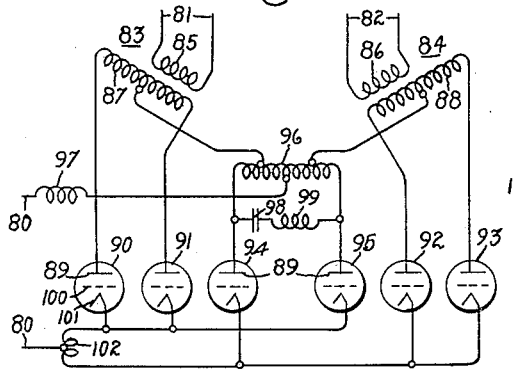
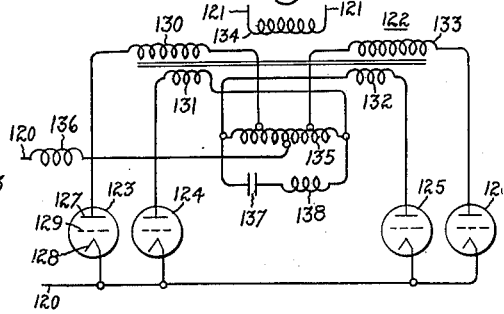
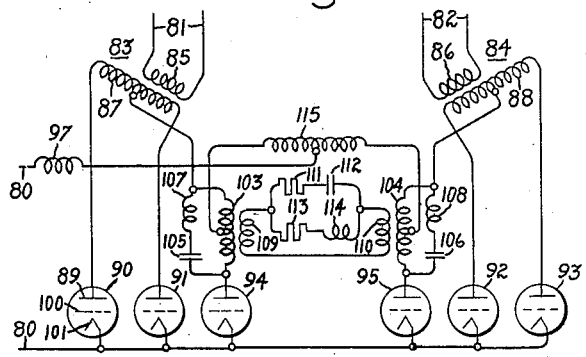
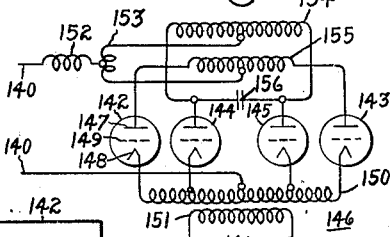
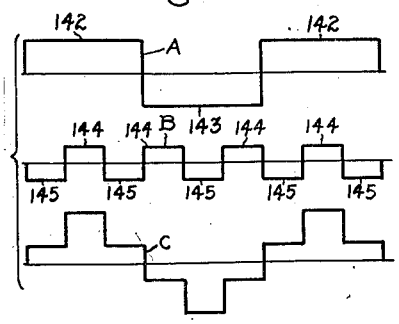

Patented Apr. 22, 1941

2,239,437

UNITED STATES PATENT OFFICE 2,239,437

ELECTRIC VALVE CONVERTING APPARATUS

Burnice D. Bedford, Schenectady, N. Y., assignor to General Electric Company, a corporation of New York Application June 21, 1939, Serial No. 280,343

18 Claims. (Cl. 175—363)

My invention relates to electric valve converting apparatus and more particularly to such apparatus adapted to transmit energy between direct and alternating current circuits, or between alternating current circuits of the same or different frequencies.

Heretofore there have been devised numerous apparatus including electric valves for transmitting energy between direct and alternating current circuits. When operating such apparatus as a rectifier transmitting energy from an alternating current circuit to a direct current circuit it has been customary to control the average voltage of the direct current circuit by retarding the phase of the grid potentials of the several electric valves with respect to their anode potentials. The effect of this type of control is to draw a lagging current from the alternating current circuit, while on the other hand it is usually preferable to draw a leading current in order to improve the power factor of the system. In the majority of the arrangements of the prior art it has not been possible to operate such a controlled rectifier at leading power factors since this type of operation involves the transfer of load current from one valve to the next succeeding valve in opposition to the electromotive force of the inductive winding interconnecting the valves. On the other hand, when operating such apparatus as an inverter for transmitting energy from a direct current supply circuit to an alternating current load circuit it has not been possible always to supply lagging loads on the alternating current circuit without the provision of an inordinate amount of commutating capacitance. This is due to the fact that a lagging power factor on the alternating current circuit corresponds to a transfer of load between the several electric valves at points in the cycle of the alternating potential when the counter electromotive force of the inductive winding connected between the valves opposes such commutation. In any case, however, it is desirable to supply a lagging power factor alternating current load by means of an electric valve converting apparatus. I accomplish the above desired operating characteristics of both a rectifier and an inverter by introducing an alternating potential in the system which is a harmonic of that of the alternating current circuit.

Certain arrangements for transmitting energy between direct and alternating current circuits under any desirable power factor conditions on the alternating current circuit are disclosed and claimed in U. S. Letters Patent 1,929,721, 1,929,- 722, 1,929,725 and 1,929,726, all granted October 10, 1933 on applications of Clodius H. Willis, and U. S. Letters Patent 1,929,565, granted October 10, 1933 on an application by Camil A. Sabbah.

It is an object of my invention, therefore, to provide a new and improved electric valve converting apparatus.

It is another object of my invention to provide an improved electric valve apparatus for transmitting energy between a direct current circuit and an alternating current circuit or between alternating current circuits of the same or different frequencies.

It is a further object of my invention to provide an improved electric valve converting apparatus for transmitting energy from a direct current supply circuit to an alternating current load circuit under lagging power factor conditions on the alternating current circuit or from an alternating current supply circuit to a direct current load circuit drawing leading current from the supply circuit.

It is a still further object of my invention to provide an improved electric valve converting apparatus for transmitting energy between direct current and alternating current circuits wherein certain of the electric discharge valves conduct current more than once during a cycle of the alternating current circuit.

In accordance with an illustrated embodiment of my invention, direct and alternating current circuits are interconnected through an inductive winding and a plurality of electric valves. The electric valves are successively rendered alternately conductive and nonconductive, certain of said valves being rendered conductive more than once during a cycle of the alternating current circuit and the current is transferred between successive valves under any desired power factor conditions on the alternating current circuit at points in the cycle when the fundamental alternating potential of the inductive winding connecting the successive valves opposes commutation by introducing into the system an alternating potential which is a harmonic of that of the alternating current circuit. This harmonic potential is obtained from a capacitor which is charged a number of times during a cycle of the alternating current potential and the discharge of the capacitor supplies the commutating potential which is a harmonic of the potential of the alternating current circuit.

My invention, both as to its organization and method of operation, together with other and further objects thereof, will best be understood by reference to the following description taken in connection with the accompanying drawings, and its scope will be pointed out in the appended claims.

In the drawings, Fig. 1 illustrates an embodiment of my invention for transferring energy between a direct current circuit and an alternating current circuit, while Fig. 2 represents certain operating characteristics of the apparatus illustrated in Fig. 1; Fig. 3 illustrates a modification of the arrangement shown in Fig. 1, while Fig. 4 discloses an embodiment of my invention wherein a minimum number of electric discharge valves are used; and Fig. 5 represents two different operating conditions of the apparatus illustrated in Fig. 4; Fig. 6 discloses an arrangement for transmitting energy between a direct current circuit and two single phase alternating current circuits, while Fig. 7 illustrates a modification of the arrangement disclosed in Fig. 6; Fig. 8 discloses a modification of Figs. 1 and 3, while Fig. 9 discloses an apparatus for transmitting energy between a direct and alternating current circuit wherein several electric discharge valves are always conductive at the same time and Fig. 10 represents certain operating conditions of the apparatus illustrated in Fig. 9.

Referring now to Fig. 1 of the drawings, there is illustrated an arrangement for transmitting energy from direct current supply circuit 10 to alternating current load circuit 11. Although I am describing my invention specifically as embodied in inverters it will be understood by those skilled in the art that the apparatus hereinafter described is equally well adapted for transferring energy from an alternating current supply circuit to a direct current load circuit or between two alternating current circuits of the same or different frequencies. An inductive winding comprising transformer 12 has its secondary winding 13 connected in the alternating current circuit while its primary winding 14 is provided with a plurality of taps which are connected to an electrode of different ones of a plurality of electric discharge valves 15, 16, 17, 18, 19. The electric discharge valves 15 to 19 may be any of the type well known in the art although I prefer to use electric discharge valves of the type wherein a plurality of electrodes are mounted within an envelope containing an ionizable medium. Accordingly, I have illustrated electric discharge valves 15 to 19 as each provided with an anode 20, a cathode 21, and a control electrode or grid 22. A commutating transformer 23 is provided with a plurality of taps for connecting the cathodes 21 of electric discharge valves 15 to 19 to one side of the direct current circuit 10. A commutating capacitor 24 and reactor 25 are connected in series with various portions of transformer 23 and cathodes 21 of electric discharge valves 15 to 19 and in parallel with certain other portions of transformer 23. The capacitor 24 supplies the harmonic commutating potential for commutating the current between the various electric discharge valves 15 to 19 while the reactor 25 is included to slow up the transfer of current between the various discharge valves for improving the output wave shape. It will be understood by those skilled in the art that instead of commutating capacitor 24 a harmonic generator or other means may be provided for supplying the harmonic commutating potential. In order to control the conductivity of electric discharge valves 15 to 19 an excitation circuit 26 is provided for control electrodes 22 of electric discharge valves 15 to 19. This excitation circuit may comprise any of the excitation circuits well known to those skilled in the art and, by way of example, I have illustrated excitation circuit 26 as comprising a plurality of grid transformers 27, 28, 28a, 29, 29a, 30, 30a and 31, each having their secondary windings connected in the grid to cathode circuit of one of the electric discharge valves 15 to 19. In each of these grid to cathode circuits I have provided a plurality of negative bias batteries 32, 33, 34, 35, 36 in series with current limiting resistors 37, 38, 39, 40, 41, respectively. The grid transformers 27 to 31 may be of the self-saturating type, or separate saturating transformers may be interposed between these transformers and the grids or control electrodes 22 of the several electric valves 15 to 19, or some other means for producing preferably a grid excitation of peaked wave form should be provided since each of the grids is to be energized periodically for relatively short intervals of time. However, this feature of exciting the grids or control electrodes with a potential of peaked wave form forms no part of my present invention but is disclosed and claimed in U. S. Letters Patent 2,080,250, granted May 11, 1937, on an application of Burnice D. Bedford. Since electric discharge valves 16, 17 and 18 are rendered conductive twice during each cycle of the alternating current output circuit 11, the secondaries of two grid transformers, 28, 28a, 29, 29a, and 30, 30a, respectively, are connected in the grid to cathode circuits of these valves. A contact rectifier 42 and resistor 43 are serially connected across the secondary winding of grid transformer 28 to bypass the grid circuit of electric discharge valve 16 during every other half cycle of the grid potential so as not to interfere with the operation of grid transformer 28a. Similarly, contact rectifiers 44, 46, 48, 50, 52, and resistors 45, 47, 49, 51, 53, are serially connected across the secondary windings of grid transformers 28a, 29, 29a, 30 and 30a, respectively. Grid transformers 29 and 29a are so arranged that both the positive and negative peaks of the grid potential are utilized to make electric discharge valve 17 conductive every 180 electrical degrees of the grid potential. The primaries of grid transformers 27 to 31, respectively, are energized from a suitable source of alternating potential 54 which has a frequency equal to that of alternating current circuit 11 and if load circuit 11 includes a source of counter-electromotive force or is independently energized alternating potential source 54 may be circuit 11. When the apparatus illustrated in Fig. 1 is operated as a rectifier then circuit 11 will preferably also supply the grid potential. Grid transformers 29 and 29a associated with electric discharge valve 17 have a common primary winding which is connected directly to the alternating current circuit 54. The primaries of grid transformers 27 and 31 are oppositely connected to alternating current circuit 54 through phase shifter 55 symbolically shown so that the positive and negative peaks 180 degrees apart may both be utilized. Similarly the primary windings of grid transformers 28 and 30 are oppositely connected to alternating current circuit 54 through phase shifter 56 symbolically shown, and the primary windings of grid transformers 28a and 30a are oppositely connected to alternating current circuit 54 through phase shifter 57 also symbolically shown.

The general principles of operation of the above described converting apparatus for transmitting energy from the direct current circuit 10 to the alternating current circuit 11 will be understood by those skilled in the art, but will be described briefly with reference to Fig. 2 wherein step curve A illustrates the alternating current output of one of the operating conditions of the apparatus illustrated in Fig. 1 when the commutating reactor 25 has a small or negligible value and rapid changes of current can occur. The steps of the curve are designated with the reference numeral corresponding to the particular electric discharge valve which is conductive during that interval to produce that portion of step curve A. The phase shifters 55, 56 and 57 are so adjusted that electric discharge valves 15 to 19 conduct in the following order during one cycle of the alternating potential of alternating current circuit 11: 15, 16, 17, 18, 19, 18, 17, 16. In the apparatus illustrater in Fig. 1 it is noted that primary winding 14 has been subdivided to equal steps between taps so that the current steps illustrated in Fig. 2 are of equal magnitude, assuming that the inductive reactance of the direct current circuit is sufficient to maintain the direct current substantially constant for the duration of a cycle of the alternating voltage of circuit 11. Furthermore, Fig. 2 illustrates the condition where the intervals of conductivity of the valves are also equal. It will be understood, of course, that the current steps and the intervals of conductivity of the electric discharge valve may both be varied in such a manner as to approach any desired output voltage by merely adjusting the taps on primary winding 14 and the excitation circuit 26, respectively. The apparatus illustrated in Fig. 1 does not include a reactor in the direct current circuit but it will be understood by those skilled in the art that generally such a reactor will be included. Assume, for example, that grid transformer 27 impresses a positive potential of peaked wave form on control electrode 22 of electric discharge valve 15. This valve will then conduct current which will flow from one side of direct current circuit 10 through the left half of primary winding 14 of transformer 12 through electric discharge valve 15 through a portion 23b of commutating transformer 23 to the other side of direct current circuit 10. However, part of this current is caused to flow through condenser 24 and reactor 25 back to direct current circuit 10 through the lower portion 23c of transformer 23, the current dividing in such a manner that zero net resultant magnetomotive force is impressed upon the windings of transformer 23. This flow of current through capacitor 24 builds up a voltage across the capacitor of such a polarity as to transfer the current from electric discharge valve 15 to electric discharge valve 16 when commutation is to occur. By this time through proper adjustment of phase shifter 56 a positive potential of peaked wave form is impressed upon control electrode 22 of electric discharge valve 16 by grid transformer 28, thus rendering conductive electric discharge valve 16. The commutating potential for transferring the current between valves 15 and 16 is obtained from the voltage built up across capacitor 24. When electric discharge valve 16 is conductive, current flows through a portion of the left half of primary winding 14 of transformer 12, through electric discharge valve 16 and the lower portion 23c of transformer 23 to the other side of the direct current circuit 10. Current also will flow through reactor 25 and capacitor 24 through portion 23b of commutating transformer 23, so as to charge capacitor 24 in a direction opposite to the charge it received when electric discharge valve 15 was conducting current. The potential built up across capacitor 24 will then commutate the current between electric discharge valves 16 and 17, and the process will be repeated with capacitor 24 being successively charged in opposite directions so as to provide a fourth harmonic commutating potential for transferring the current between the several electric discharge valves. When electric discharge valve 17 is conductive no current flows through primary winding 14 but current flows through valve 17, portions 23a and 23b of commutating transformer 23 to the other side of direct current circuit 10. Current will also flow through the parallel circuit including capacitor 24, reactor 25 and portion 23c of commutating transformer 23. As will be well understood by those skilled in the art, grid transformers 27 to 31 will successively render electric discharge valves 15 to 19 conductive, and according to the particular arrangement illustrated in Figs. 1 and 2 electric discharge valve 19 is rendered conductive 180 electrical degrees after electric discharge valve 15. As may be observed from Fig. 2 the grid transformers 27 to 31 are so energized as to render electric discharge valves 16, 17, 18 conductive twice during each cycle, while electric discharge valves 15 to 19 are rendered conductive only once during each cycle.

In order that the electric discharge valves 15 to 19 of Fig. 1 may have a common cathode potential so that a single electric discharge valve of the multi-anode type may replace the plurality of valves 15 to 19, I have disclosed in Fig. 3 a modification of the apparatus illustrated in Fig. 1. Similar parts of the apparatus are characterized by the same reference numerals. The transformer 12 is provided with two primary windings 14 and 14a whereby it is possible to operate the electric discharge valves 15 to 19 with a common cathode potential. A reactor 60 is connected in series with the direct current circuit 10 in order to improve the wave shape. The commutating transformer 23, capacitor 24 and reactance 25 operate identically with the corresponding parts illustrated in Fig. 1 and the operation of this apparatus will be well understood in the light of the description set forth in connection with Fig. 1. It will, of course, be understood that electric discharge valves 15 to 19 may be replaced by a single valve comprising a plurality of anodes and a single cathode such as are well known in the art.

In some inverters where the refinement in wave shape obtained by the apparatus illustrated in Figs. 1 and 3 is not required, I have provided in Fig. 4 an apparatus utilizing only three electric discharge valves which is especially suitable for supplying a constant alternating current voltage load from a constant current direct current supply circuit. In Fig. 4 energy is transmitted from the constant current direct current source 61 to the alternating current load circuit 62 through the inductive windings of transformer 63 and a plurality of electric discharge valves 64, 65, 66. Transformer 63 is provided with a secondary winding 67 connected in the alternating current circuit 62. The primary winding 68 of transformer 63 has its end terminals connected to the anodes 69 of electric discharge valves 64 and 66. The anode 69 of electric discharge valve 65 is connected in series with commutating capacitor 70 and reactor 71 to a midtap 72 of primary winding 68 of transformer 63. A commutating transformer 74 is connected in parallel with capacitor 70 and reactance 71. A reactor 75 is connected in series with the direct current 61 to a point on commutating transformer 74. The cathodes 76 of electric valves 64 to 66 are all connected to one side of the direct current circuit 61. Although I have illustrated electric discharge valves 64 to 66 as of the single anode, single cathode type, it will be understood that these valves may be replaced by a single electric discharge valve comprising a plurality of anodes and a single cathode. Each of the electric discharge valves 64 to 66 is provided with a grid or control electrode 77 which is energized by any suitable excitation circuit well known by those skilled in the art, for example, an excitation circuit similar to that illustrated in Fig. 1. The electric discharge valves 64 and 66 conduct only once during a cycle of the alternating current circuit, while electric discharge valve 65 conducts twice during this cycle. As in Figs. 1 and 3, capacitor 70 supplies the commutating voltage by becoming successively charged in opposite directions depending upon the particular discharge valves which are conductive.

The operation of the apparatus illustrated in Fig. 4 can best be understood with reference to Fig. 5 where curves A and B indicate two different operating characteristics of the electric valve converting apparatus, A indicating the operating characteristic for maximum output of the apparatus while B indicates the characteristic for minimum output of the apparatus. As in Fig. 2 the portions of the curves A and B are designated by the numeral referring to the particular valve which is conductive during the time when that portion of the output current is produced. It will be observed from curve A that electric discharge valve 65 conducts twice during each cycle but conducts current only for a very short period of time, while in curve B electric discharge valves 64 and 66 conduct current for relatively short periods of time as compared with electric discharge valve 65. It is evident that the output current can be controlled to a considerable extent by controlling the length of the conducting periods of electric discharge valves 64 to 66. The control range will depend of course upon the load and the circuit constants since each valve must conduct for a sufficient interval of time so as to build up a commutating voltage across capacitor 70. The best point at which one of the direct current lines 61 is connected to commutating transformer 74 will depend upon the ratio of the commutating periods of the electric discharge valves 64 to 66. If the ratio of conducting periods is to be varied this transformer must be designed to carry a direct current component without saturating. The commutation potential of capacitor 70 will be a second harmonic of the potential of alternating current circuit 62.

In Fig. 6 I have illustrated my invention as applied to a converting apparatus for transmitting energy from direct current circuit 80 to two single phase circuits 81 and 82. A pair of transformers 83 and 84 have their secondary windings 85 and 86 connected, respectively, across the alternating current circuits 81 and 82, while the primary windings 87 and 88 have their end terminals connected, respectively, to the anodes 89 of electric discharge valves 90, 91, 92, 93, while the midpoints of primary windings 87 and 88 are connected through a commutating transformer 96 to the anodes 89 of electric discharge valves 94 and 95 respectively. A reactor 97 is connected in one direct current line in series with a tap on commutating transformer 96. Commutating capacitor 98 and reactor 99 are connected in parallel with commutating transformer 96. Each of the electric discharge valves 90 to 95 is provided with a control electrode or grid 100 and a cathode 101. The cathodes 101 of electric discharge valves 90 to 95 are connected through a reactor or interphase transformer 102 to the other side of direct current circuit 80. Reactor 99 will tend to slow up the current changes which will tend to improve the wave shape of the electric valve converting apparatus. Any suitable excitation circuit may be provided for control electrodes 100, as for example one similar to excitation circuit 26 of Fig. 1. Electric discharge valves 90 and 91 will conduct current once during a cycle of alternating current circuit 81, while electric discharge valve 94 will conduct twice during this cycle. Similarly, electric discharge valves 92 and 93 will each conduct current once during a cycle of alternating current circuit 82 while electric discharge valve 95 will conduct current twice during this cycle. The single capacitor 98 is common to both alternating current circuits insofar as supplying the commutating voltage is concerned and, as in Fig. 4, will supply a commutating voltage which is a second harmonic of the voltage in alternating current circuits 81 and 82. The operation of the apparatus illustrated in Fig. 6 will be understood by those skilled in the art in view of the description of the apparatus illustrated in Fig. 4, the essential difference being that a single commutating capacitor 98 supplies the commutating voltage for two single phase alternating current circuits 81 and 82. Thus, phases 81 or 82 need not be equally loaded so that capacitor 98 may supply the necessary commutating voltage.

In order that electric discharge valves 90 to 95 of Fig. 6 may operate at a common cathode potential and also better to insure a supply of commutating voltage if only one of the phases of the two-phase output is supplying a load, I have illustrated in Fig. 7 a modification of Fig. 6 wherein the same reference numerals designate corresponding parts. The cathodes 101 of electric discharge valves 90 to 95 are all connected to one side of the direct current circuit and it will, of course, be understood by those skilled in the art, that the single anode single cathode valves 90 to 95 may be replaced by a single electric discharge valve having a plurality of anodes and a single cathode. Two commutating transformers 103 and 104 are provided, one for each single phase circuit and are connected in parallel with the respective commutating capacitors 105 and 106 and commutating reactors 107 and 108, respectively. Commutating transformers 103 and 104, respectively, are coupled by means of windings 109 and 110 with an impedance comprising resistance 111 and capacitor 112 connected in parallel with resistance 113 and reactor 114. The commutating capacitors 105 and 106 combined with capacitor 112 will therefore supply commutating potential as long as a single one of the alternating current circuit phases 81 or 82 is loaded. The choice of the impedance elements 111 to 114 permits a choice of wave shapes in the output circuits 81 and 82. A reactor or interphase transformer 115 has its end terminals connected to the commutating transformers 103 and 104 while its midtap is connected to one side of the direct current circuit 80. Reactors 107 and 108 will permit only slow current changes and hence will improve the output wave shape of the alternating current voltages. The operation of the apparatus illustrated in Fig. 7 will be well understood by those skilled in the art, and as in Fig. 6, a second harmonic commutating voltage will be supplied. Electric discharge valves 90 and 91 will conduct current once during each cycle of the output circuit 81 while electric discharge valve 94 will conduct twice during this same cycle. Similarly, electric discharge valves 92 and 93 will conduct once during each cycle of alternating current circuit 82 while electric discharge valve 95 will conduct current twice during this cycle. A suitable excitation circuit for the control electrodes 100 of electric discharge valves 90 to 95 may be supplied, as will be understood by those skilled in the art, for example, an excitation circuit similar to that illustrated in Fig. 1.

In Fig. 8 I have illustrated an electric valve converting apparatus utilizing four electric discharge valves wherein a third harmonic commutating voltage is supplied for commutating the current between the various valves. Energy is transferred from direct current circuit 120 to alternating current load circuit 121 through inductive windings 122 and a plurality of electric discharge valves 123, 124, 125 and 126. Each of the electric discharge valves is provided with an anode 127, a cathode 128 and a control electrode or grid 129. The cathodes 128 of electric discharge valves 123 to 126 are all connected to one side of direct current circuit 120, while the anodes 127 of electric discharge valves 123 to 126 are each connected to one terminal of a four part primary winding comprising sections 130, 131, 132, 133, respectively, of transformer 122 which are inductively related with secondary winding 134 connected across alternating current circuit 121. The other terminals of winding sections 130 to 133 are connected to various points on commutating transformer 135, the midpoint of which is connected through reactor 136 to the other side of direct current circuit 120. A commutating capacitor 137 and commutating reactor 138 are connected in parallel with commutating transformer 135. The electric discharge valves 123 to 126 conduct current in the following sequence during one cycle of the alternating current circuit 121: 123, 124, 125, 126, 125, 124, that is, electric discharge valves 124 and 125 conduct current twice during each cycle of the alternating current circuit while electric discharge valves 123 and 126 conduct current only once during this cycle. Capacitor 137 is, as in Fig. 1, charged first in one direction and then in the other direction as successive electric discharge valves conduct current so as always to supply a third harmonic commutating voltage for commutating the current between respective valves. It will be understood that any suitable control circuit may be provided for control electrodes 129.

In Fig. 9 I have illustrated an electric valve converting apparatus for transmitting energy from direct current circuit 140 to alternating current circuit 141 wherein more than one electric discharge valve is conducting current during any given interval. A plurality of electric discharge valves 142, 143, 144 and 145 and inductive winding, or transformer 146 interconnect the alternating current circuit 141 with the direct current supply circuit 140. Each of the electric discharge valves 142 to 145 is provided with an anode 147, a cathode 148 and a grid or control electrode 149. The cathodes 148 of electric discharge valves 142 and 143 are connected to different taps on the primary winding 150 of transformer 146. The secondary winding 151 of transformer 146 is connected to the alternating circuit 141. One side of the direct current circuit 140 is connected to the midpoint of primary winding 150 of transformer 146 while the other side of direct current 140 is connected through a reactor 152 to interphase transformer 153, the terminals of which are connected to the midpoint of transformers 154 and 155, respectively. A commutating capacitor 156 is connected across the anodes 147 of electric discharge valves 144 and 145. As illustrated electric discharge valves 142 and 143 conduct only once during a cycle of the alternating current circuit while electric discharge valves 144 and 145 conduct three times each during a cycle of the alternating current circuit and the voltage ratios of the windings on transformers 154 and 155 are proportioned to produce a third harmonic of voltage on commutating capacitor 156 to transfer the current from one valve to another. The interphase transformer 153 causes the current to flow in two different tubes at the same time and the magnetizing current of this interphase transformer is such as to obtain slow transfer thereby to improve the wave shape. The operation of the apparatus illustrated in Fig. 9 may best be understood with reference to Fig. 10 wherein curve A illustrates the current flow through electric discharge valves 142 and 143 while the curve B illustrates the current flowing through electric discharge valves 144 and 145 when the reactances of the direct current circuit is negligible. The steps in the curve are designated by the numeral representing the particular valve which is conductive to produce that current step. These curves represent one particular operating condition of the apparatus since it will be understood by those skilled in the art that the voltage steps may be varied by changing the position of the taps on primary winding 150 of transformer 146. Furthermore the conducting interval of electric discharge valves 142 to 145 may be varied over a wide range. Curves A and B in Fig. 10 represent the condition when electric discharge valves 142 and 143 conduct twice as much current as electric discharge valves 144 and 145 and valves 144 and 145 each conduct three times during a cycle of alternating current circuit 141 while valves 142 and 143 conduct only once during this cycle. Curve C of Fig. 10 represents the output current in circuit 141 and is the resultant of curves A and B. It will be understood that the shape of curve C may be varied widely by controlling the current steps and also the intervals of conductivity and by suitably proportioning reactance 152 a sinusoidal wave shape may be approached.

Although I have illustrated various apparatus embodying my invention for transmitting energy from a direct current source to an alternating current source, it will be understood by those skilled in the art that my invention is equally adapted to electric valve converting apparatus for transmitting energy from an alternating current circuit to a direct current circuit or between alternating current circuits of different frequencies.

While I have shown and described my invention in connection with certain specific embodiments, it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States, is:

1. A system for transmitting energy between a plurality of electric circuits, at least one of which is an alternating current circuit, comprising an inductive winding and a plurality of electric valves for interconnecting said circuits, means for rendering a portion of said plurality of electric valves conductive more than once during a cycle of the current flowing in said alternating current circuit, and means for producing an alternating potential which is a harmonic of the potential of said alternating current circuit for commutating the current between said plurality of electric valves.

2. A system for transmitting energy between direct and alternating current circuits comprising an inductive winding provided with a plurality of taps, a plurality of electric valves associated with said taps for transmitting energy between said circuits, means for controlling the conductivity of said valves so that certain of said valves are rendered conductive more than once during a cycle of the alternating current, and a capacitor which is charged and discharged at a frequency which is a harmonic of that of said alternating current circuit for commutating the current between said electric discharge valves.

3. In an electric valve converting apparatus, a direct current circuit, an alternating current circuit, means for transmitting energy between said circuits comprising a plurality of electric discharge valves, a commutating transformer and a commutating capacitor said capacitor being arranged to be alternately charged in opposite directions as said discharge valves are rendered successively conductive so as to produce a potential which is a harmonic of the alternating current voltage for commutating the current between the various electric discharge valves, and means for controlling the conductivity of said valves so that certain of said valves are rendered conductive more than once during a cycle of the alternating current.

4. In an electric valve converting apparatus, a plurality of electric circuits, at least one of which is an alternating current circuit, means for transmitting energy between said circuits comprising an inductive winding and a plurality of electric discharge valves, means for rendering certain of said valves conductive more than once during a cycle of said alternating current circuit, a commutating capacitor, and a commutating transformer arranged so as to cause said capacitor to become alternately charged in opposite directions as successive electric discharge valves become conductive so as to commutate the current between successive valves.

5. A system for transmitting energy between rect and alternating current circuits comprising a transformer provided with a plurality of windings, a plurality of electric discharge valves each provided with an anode, a cathode and a control electrode associated with said plurality of windings, means for controlling the conductivity of said valves so that certain of said valves are rendered conductive more than once during a cycle of said alternating current circuit, and a capacitor and commutating transformer so constructed and arranged that said capacitor is charged and discharged at a frequency which is a harmonic of that of said alternating current circuit for commutating the current between said electric discharge valves.

6. In an electric valve converting apparatus, a direct current circuit, an alternating current circuit, means for transmitting energy between said circuits comprising inductive windings and a plurality of electric discharge valves, means for rendering a portion of said plurality of electric valves conductive more than once during a cycle of said alternating current circuit, and means for varying the intervals of conductivity of certain of said electric discharge valves relative to the other electric discharge valves so that the wave shape of the alternating current may be controlled.

7. A system for transmitting energy between direct and alternating current circuits comprising an inductive winding and a plurality of electric valves for interconnecting said circuits, means for rendering a portion of said plurality of electric valves conductive more than once during a cycle of said alternating current, means for controlling the intervals of conductivity of said plurality of electric discharge valves so that certain of said valves conduct current for longer intervals than certain others, and means for producing an alternating potential which is a harmonic of the potential of said alternating current circuit for commutating the current between said plurality of electric discharge valves.

8. A system for transmitting energy between direct and alternating current circuits comprising inductive windings and a plurality of electric valves for interconnecting a single phase of said alternating current circuit and said direct current circuit, means for rendering a portion of said plurality of electric valves conductive more than once during a cycle of the current flowing in said alternating current circuit, and means for rendering said valves conductive at different times in the voltage wave of said alternating current circuit including means for producing a voltage which is a harmonic of the voltage of said alternating current circuit for commutating the current between said plurality of electric valves.

9. In an electric valve converting apparatus, a source of direct current, an alternating current load circuit, an inductive winding provided with a plurality of taps, a plurality of electric valves associated with said taps for transmitting energy between said direct and alternating current circuits, means for controlling the conductivity of said valves including a plurality of transformers, certain of said valves being provided with more than one of said transformers so as to be rendered conductive more than once during a cycle of said alternating current load, and means for producing an alternating potential which is a harmonic of the potential of said alternating current circuit for commutating the current between said plurality of electric valves.

10. In an electric valve converting apparatus, a direct current supply circuit, an alternating current load circuit, means for transmitting energy between said circuits comprising a plurality of electric discharge valves and an inductive winding, a control circuit for each of said discharge valves including a plurality of grid transformers, certain of said control circuits being provided with more than one grid transformer so as to be rendered conductive more than once during a cycle of the alternating current load circuit, means connected in certain of said control circuits for by-passing every other half cycle of the grid potential, and means for producing an alternating potential which is a harmonic of the potential of said alternating current circuit for commutating the current between said plurality of electric valves.

11. In an electric valve converting apparatus, a source of constant current direct current, an alternating current load circuit, means for transmitting energy between said circuits comprising inductive windings and a plurality of electric discharge valves, means for rendering one of said electric valves conductive more than once during a cycle of said alternating current load circuit, and means for varying the interval of conductivity of said one electric discharge valve relative to the other electric discharge valves so as to control the power output of said electric valve converting apparatus.

12. In an electric valve converting apparatus, a source of constant current direct current, an alternating current load circuit, means for transmitting energy between said circuits comprising inductive windings and a plurality of electric discharge valves, means for rendering one of said electric valves conductive more than once during a cycle of said alternating current load circuit, means for varying the interval of conductivity of said one electric discharge valve relative to the other electric discharge valves so as to control the power output of said electric valve converting apparatus, and means for producing an alternating potential which is a harmonic of the potential of said alternating current load circuit for commutating the current between said plurality of electric valves.

13. In an electric valve converting apparatus, a direct current supply circuit, a pair of single phase alternating current load circuits, means for transmitting energy between said direct current circuit and each of said alternating current circuits comprising a pair of inductive windings and a plurality of electric discharge valves associated with each of said load circuits, means for rendering certain of said electric discharge valves associated with each load circuit conductive more than once during a cycle of the alternating current load circuits and a single means for producing an alternating potential which is a harmonic of the potential of said alternating current circuits for commutating the current between said plurality of electric discharge valves associated with each of said load circuits.

14. In an electric valve converting apparatus, a supply circuit, a plurality of single phase alternating current load circuits, means for transmitting energy between said supply circuit and said alternating current circuits comprising a plurality of inductive windings and a plurality of electric discharge valves associated with each of said load circuits, means for rendering certain of said electric discharge valves associated with each load circuit conductive more than once during a cycle of alternating current load circuits, means for producing an alternating potential which is a harmonic of the potential of said alternating current circuits for commutating the current between said plurality of electric discharge valves associated with each of said load circuits, and impedance means for coupling said plurality of circuits.

15. A system for transmitting energy between a plurality of electric circuits at least one of which is an alternating current circuit comprising transformer means and a plurality of electric discharge valves associated therewith for interconnecting said circuits, said transformer means being so constructed and arranged as to impress potentials of different magnitudes on certain of said plurality of electric valves, and means for rendering said valves conductive at different points in the potential wave of said alternating current circuit including means for producing an alternating potential which is a harmonic of the potential of said alternating current circuit for commutating the current between said plurality of electric valves.

16. A system for transmitting energy between direct and alternating current circuits comprising a transformer including a pair of inductive windings one of which is provided with a plurality of taps so as to afford means for obtaining different ratios of transformation, a plurality of electric discharge valves associated with said taps for transmitting energy of different magnitudes between said circuits, and means for rendering said valves conductive at different points in the potential wave of said alternating current circuit including means for producing an alternating potential which is a harmonic of the potential of said alternating current circuit for commutating the current between said plurality of electric valves.

17. In an electric valve converting apparatus for transmitting energy between a plurality of electric circuits at least one of which is an alternating current circuit, a transformer and a plurality of electric valves for interconnecting said circuits so constructed and arranged that certain of said valves have different turn ratios of said transformer associated therewith, and means for rendering said valves conductive at different points in the potential wave of said alternating current circuit including means for producing an alternating potential which is a harmonic of the potential of said alternating current circuit for commutating the current between said plurality of electric valves.

18. A system for transmitting energy between a plurality of electric circuits at least one of which is an alternating current circuit comprising inductive windings and a plurality of electric valves for interconnecting said circuits, means for rendering more than one of said electric discharge valves conductive at the same time, means for rendering a portion of said plurality of electric valves conductive more than once during a cycle of the current flowing in said alternating current circuit, and means for producing an alternating potential which is a harmonic of the potential of said alternating current circuit for commutating the current between said plurality of electric valves.

BURNICE D. BEDFORD.